United States Patent
Fukasawa et al.

[15] 3,675,227
[45] July 4, 1972

[54] LIQUID-LEVEL DROP ALARMING SYSTEM

[72] Inventors: Noburu Fukasawa; Yukiyoshi Hatori, both of Yokohama, Japan

[73] Assignee: Nissan Motor Company, Limited, Yokohama, Japan

[22] Filed: March 22, 1971

[21] Appl. No.: 126,499

[30] Foreign Application Priority Data

April 1, 1970 Japan.................................45/27115

[52] U.S. Cl..........................340/244 A, 340/59, 340/52 H, 340/262
[51] Int. Cl. ...................................B60r 18/00, G08b 23/00
[58] Field of Search ..........................340/59, 244 R, 244 A

[56] References Cited

UNITED STATES PATENTS 2,855,582  10/1958  Tweedale..........................340/244 A

*Primary Examiner*—Thomas B. Habecker
*Attorney*—John Lezdey

[57] ABSTRACT

A liquid-level drop alarming system is provided, which comprises a sensor for sensing the level of a liquid stored in a reservoir, a drive signal generator for generating a drive signal in accordance with the output from the sensor and an alarm means for producing an alarm signal in accordance with the drive signal. The drive signal generator is adapted to be inoperative or disabled when the liquid is localized with the reservoir inclined from the horizontal plane or subjected to vibrations, acceleration or deceleration.

6 Claims, 7 Drawing Figures

INVENTORS
NOBURU FUKASAWA + YUKIYOSHI HATORI
BY
John Lezoley
ATTORNEY

LIQUID-LEVEL DROP ALARMING SYSTEM

This invention relates to a liquid-level drop alarming system and more particularly to a liquid-level drop alarming system which is reliable in detecting a liquid level in a reservoir even though the liquid is in a localized state when the liquid is subjected to vibrations, acceleration, deceleration and/or inclination from horizontal of the reservoir.

Liquid-level drop alarming devices are used to inform an operator of a drop of a stored liquid below an allowable level which is predetermined. Where such alarming devices are subject to motions such as vibrations, acceleration, deceleration and inclination, the liquid tends to be temporarily localized to cause the alarming devices to operate to produce an undue alarm signal. This tendency is pronounced especially where the alarming devices are used on fuel reservoirs of motor vehicles in which external turbulences are applied to the fuel reservoirs.

It is therefore an object of this invention to provide an improved liquid-level alarming system adapted to alarm a drop of the level of a liquid below an allowable limit, even in the presence of turbulences or surges at the surface of the liquid resulting from vibrations, acceleration, deceleration, and/or inclination of the reservoir containing the liquid.

Generally the system of this invention includes a sensing means responsive to a level of a liquid contained in a reservoir for producing a signal when the level of the liquid drops below an allowable limit, drive signal generating means for generating a drive signal in response to the signal from said sensing means, wherein the generating means includes disabling means for disabling the generating means when the liquid is localized in the reservoir, and alarm means for producing an alarm signal in response to the drive signal.

Figure 1:
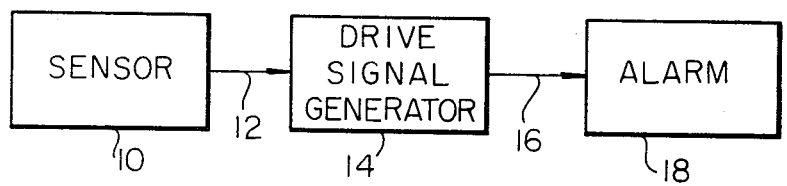
FIG. 1 is a block diagram illustrating a basic construction of a liquid-level drop alarming system according to this invention.

Referring now to FIG. 1, an alarming system of this invention comprises a sensing means 10 adapted to sense the level of a liquid such as oil or gasoline stored in a reservoir or tank (not shown). The sensing means 10 produces a signal when the level of the liquid drops below an allowable limit. The signal is applied through a line 12 to a drive signal generating means 14 which generates a drive signal when it receives the signal from the sensing means 10. The drive signal from the signal generating means 14 is applied through a line 16 to an alarm means 18 which then produces an alarm signal informing that the level of the liquid is lowered below the allowable limit.

The drive signal generating means 14 includes a disabling means which detects a localized condition of the liquid in the reservoir as caused by the vibrations, acceleration, deceleration and/or inclination from horizontal of the reservoir and which disables the signal generating means so as to prevent the signal generating means from generating the alarm signal even if the signal from the sensor 10 is present.

Since the generating means 14 includes such disabling means as above-mentioned, the generating means is prevented from producing the drive signal when the liquid is localized to cause the sensing means erroneously detect the level of the liquid as reduced below the allowable limit.

Figure 2:
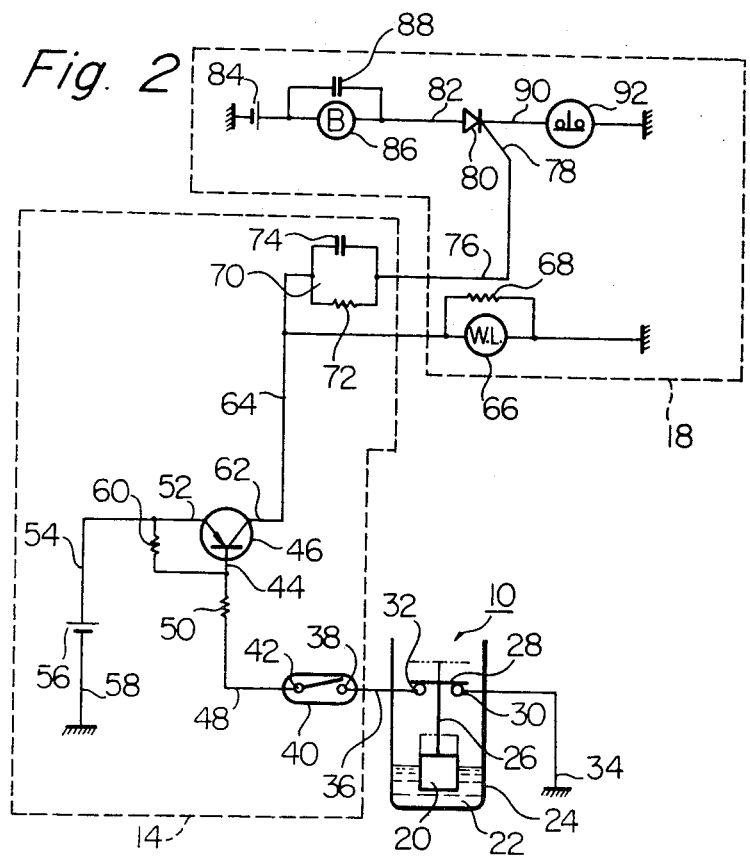
FIG. 2 is a circuit diagram which demonstrates a practical electric arrangement of the system shown in FIG. 1.

FIG. 2 shows a practical circuit arrangement of the system of FIG. 1, in which the sensor 10 has a usual float 20 which floats on a liquid 22 contained in a reservoir 24 such as fuel tank, oil pan or the like. The float 20 is connected through a link 26 to a movable contact 28 interconnecting or disconnecting stationary contacts 30 and 32. The contact 30 is grounded through a line 34 and the other contact 32 is connected through a line 36 to a contact 38 of a switch 40 forming part of disabling means of a drive signal generating means 14. This switch 40 is mounted on a common support (not shown) on which the reservoir 24 is mounted. The switch 40 is normally closed and opened when the reservoir 24 is inclined from the horizontal plane and/or subjected to acceleration, deceleration, shocks or vibrations so that the sensor 10 is liable to erroneously detect the level of the liquid 22 which is localized in the reservoir 24. The switch 40 has another contact 42 which is connected to a base 44 of a transistor 46 through a line 48 and a resistor 50. An emitter 52 of the transistor 46 is connected through a line 54 to a positive d.c. power source 56 the negative terminal of which is grounded through a line 58. In this instance, the transistor 46 is shown to be of PNP type and therefore the positive source 56 is used. Where desired, a negative d.c. source may be employed if an NPN transistor is placed on use. A resistor 60 is connected to both the base 44 and the emitter 52 of the transistor 46. A collector 62 of the transistor 46 is connected through a line 64 to a terminal of a warning lamp 66 shunted by a resistor 68 of the alarm 18. The other terminal of the warning lamp 66 is grounded. The resistor 68 is intended to maintain a circuit from the collector 62 to the ground in case the warning lamp 66 fails. The collector 62 is also connected to a gate terminal 78 of an SCR 80 (silicon controlled rectifier) through a parallel connection 70 of a resistor 72 and a speed-up capacitor 74 and a line 76. This speed-up capacitor 74 is effective for speeding up the rise-up of a signal passing through the parallel connection 70. An anode 82 of the SCR 80 is connected to a positive power source 84 through a buzzer 86 shunted by a capacitor 88. A cathode 90 of the SCR 80 is grounded through a push button 92 which is adapted to hold its circuit closed or opened once depressed.

In operation, as long as the level of the liquid 22 in the reservoir 24 is higher than the allowable limit, the float 20 and accordingly the movable contact 28 are held in raised positions indicated by the broken lines so that the contacts 30 and 32 are disconnected from each other. When the level of the liquid 22 drops below the allowable limit and the float 20 lowers, the movable contact 28 interconnects the contacts 30 and 32. If, in this condition, the switch 40 is closed, the base 44 of the transistor 46 is grounded through the resistor 50 so that a base current flows from the emitter 52 to the base 44 so as to make the transistor 46 conductive. With the transistor 46 conductive, a collector current flows from the collector 62 to the warning lamp 66 and the resistor 68 so as to cause the warning lamp 66 to glow. In this instance, the potential on the line 64 rises to a value equal to the product of the collector current and the total resistance of the parallel connections of the warning lamp 66 and the resistor 68. This rise of the potential on the line 64 is transmitted as the drive signal to the gate 78 of the SCR 80 through the line 76, triggering the SCR 80. The push button 92 is assumed to be closed in this condition so that the SCR 80 which is now triggered becomes conductive to complete a circuit from the source 84 through the buzzer 86, the SCR 80 and the push button 92 to the ground thereby to energize the buzzer 86 to alarm. The capacitor 88 connected in parallel with the buzzer 86 maintains the conduction of the SCR 80 although the buzzer 86 interrupts its own inner circuit during its operation.

It is important that when the reservoir 24 is inclined and/or subjected to vibrations, acceleration, or deceleration by any external forces to cause liquid 22 to be localized in the reservoir 24, the switch 40 is opened so as to break a circuit from the base 44 through the resistor 50 and the contacts 30 and 32 to the ground even when the contacts 30 and 32 are connected to each other. Under this connection, the drive signal generator 14 is inoperative or disabled even if the sensor 10 is in the position to close the circuit between the lines 34 and 36.

In this instance, it should be noted that the switch 40 may be interposed anywhere in the circuit of the drive signal generator 14, for example, on the line 54, 64 or 76.

It should be understood that the alarm means 18 is self-maintaining because the SCR 80 maintains its conductive state after the triggering signal has been applied to its gate. Therefore, it is convenient that, even if the drive signal disappears with the drive signal generator 14 disabled by the switch 40, the alarm means 18 is kept actuated until the operator depress the push button 92 to open the circuit.

The warning lamp 66 provides a visual indication of the liquid supply requirement until the reservoir 24 is replenished.

Some practical examples of the switch 40 are now shown in FIGS. 3 to 7.

Figure 3:
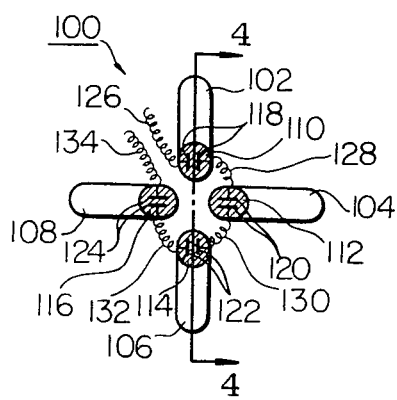
FIG. 3 is a plan view of a mechanically actuated switch which may be employed in the system of this invention.
Figure 4:
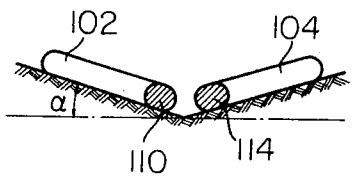
FIG. 4 is a cross-sectional view taken on line 4—4 of FIG. 3.

Referring to FIGS. 3 and 4, a mercury switch 100 comprises four substantially identical enclosures 102, 104, 106 and 108 which are radially equiangularly spaced from each other and have confined therein droplets 110, 112, 114 and 116, respectively, of mercury. Each of the enclosures is downwardly inwardly inclined to make an angle α from the horizontal plane as shown in FIG. 4 so that the dropletes 110, 112, 114 and 116 of mercury are located at the innermost portions of the enclosures as far as the mercury switch 100 is maintained horizontal. The enclosures have pairs of stationary contacts 118, 120, 122 and 124 located at their innermost portions and immersed in the respective droplets of mercury. These contacts are connected in series with one another by means of conduction 126, 128, 130, 132 and 134.

Since the mercury switch 100 is usually maintained horizontal, the mercury droplets are located at the innermost portions of the enclosures so that a circuit from the conductor 126 through the four pairs of contacts 118 through 124 to the conductor 134 is usually completed. When the mercury switch 100 is so inclined that at least one of the mercury droplets is moved toward the outermost portion of the enclosure, the contacts of the particular enclosure are disconnected with the result that the circuit from the conductor 126 to the conductor 134 is opened. The outward movement of the mercury droplet or droplets apparently results also from a force of inertia caused by acceleration, deviation and/or vibrations which the switch 100 encounters.

Figure 5:
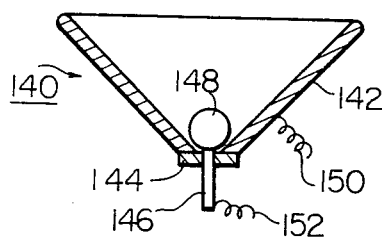
FIGS. 5 and 6 are cross-sectional views of switches as alternative to the switch of FIGS. 3 and 4.

In FIG. 5, a conical switch 140 is shown, which comprises a conical structure 142 with open ends made of a conductive material hand having an insulator member 144 attached to its lower end. The insulator member 144 has a conductive rod 146 which is passed therethrough and which is insulated from the conical structure 142 by the insulator member 144. The inner end of the conductive rod 146 is electrically connected to the conical structure 142 by means of a conductive ball 148 having a substantial weight. The ball 148 is seated by its own weight on an uppermost end of the rod 146 and an inner lower peripheral wall of the conical structure 142. When the conical switch 140 is inclined, or subjected to acceleration, deceleration or vibrations, the conductive ball 148 is caused to deviate from its normal lowest position by a force of inertia produced therein so that the electrical connection between the rod 146 and the conical structure 142 is interrupted. Therefore, the conical switch 140 can be utilized for the drive switch 40 by providing leads 150 and 152 to the conical structure 142 and the outer end of the rod 146.

Figure 6:
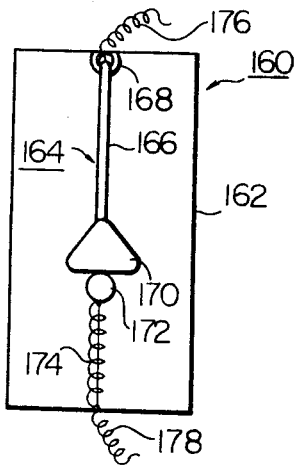

In FIG. 6, a pendulum switch 160 is shown, which comprises a housing 162 in which a pendulum 164 consists of a conductive rod 166 depending through from a pivotal connection 168 from an upper inner wall of the housing 162 and a conductive weight 170 fixed at the other end of the rod 166 and generally configurated as triangular. The weight 170 abuts at its lower end portion against a conductive ball 172 supported on a top portion of a resilient member 174 such as a spring which is fixed on a lower inner wall of the housing 162. Two leads 176 and 178 are secured to the rod 166 and the resilient member 174, respectively. When the pendulum switch 160 is inclined or subjected to acceleration, deceleration or vibrations, the weight 170 is caused to deviate from its normal position by a force of inertia produced therein and disengages from the ball 172 so that a circuit from the lead 176 through the pendulum 164 and the ball 172 to the lead 178 is opened.

Figure 7:
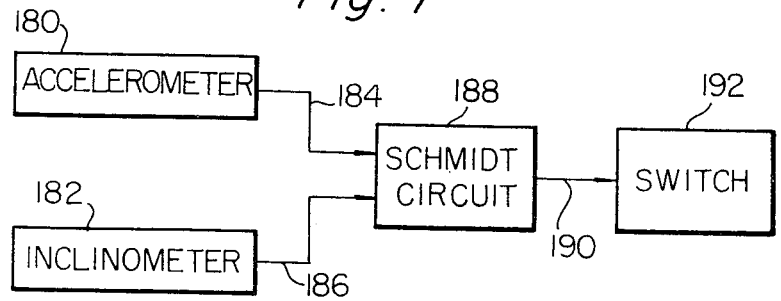
FIG. 7 is a block diagram illustrating an electrically actuated switch which may be employed in lieu of the switches previously shown.

While the switches shown in FIGS. 3 to 6 are constructed to be actuated in a mechanical fashion, the switch 40 may be arranged to operate electrically, an example of such arrangement being illustrated in FIG. 7. The switch herein shown includes an accelerometer 180 and an inclinometer 182. The accelerometer 180 produces an output signal in accordance with an acceleration applied thereto while the inclinometer 182 produces an output signal when the switch in its entirety is inclined from the horizontal plane. The output signals from the accelerometer 180 and the inclinometer 182 are applied through lines 184 and 186, respectively, to a controller 188 which then produces a drive signal when either of the output signals from the accelerometer 180 and inclinometer 182 exceeds a predetermined level. This controller 188 may be comprised by a Schmidt circuit as illustrated. The drive signal is applied through a line 190 to a switch element 192 which may be a relay.

It should be apparent from the above detailed description that an improved liquid-level alarming system is provided by this invention. The described system is not affected by the localized condition of the liquid in the reservoir and thus provides reliability in alarming a drop in the liquid level.

It should be understood that this invention is not to be limited to the exact construction shown and described and that various changes and modifications may be made without departing from the spirit and scope of this invention, as defined in the appended claims.

What is claimed is:

1. A liquid-level drop alarming system comprising sensing means responsive to a level of a liquid contained in a reservoir for producing a signal when the level of said liquid drops below an allowable limit, drive signal generating means for generating a drive signal in response to said signal from said sensing means, said generating means including disabling means for disabling said generating means when said liquid is localized in said reservoir, and alarm means for producing an alarm signal in response to said drive signal.

2. A liquid-level drop alarming system according to claim 1, wherein said disabling means comprises a mechanically actuated, normally closed switch responsive to acceleration, deceleration and/or inclination from horizontal of said reservoir and opened in response thereto.

3. A liquid-level drop alarming system according to claim 1, wherein said disabling means comprises an accelerometer, an inclinometer, a controller to which said accelerometer and inclinometer are connected in parallel and which receives the output signals therefrom for producing a drive signal in accordance with said output for signals, and a switch connected to said controller to receive said driving signal for disabling said generating means.

4. A liquid-level alarming system according to claim 1, wherein said alarm meanS is self-maintaining once actuated by said drive signal.

5. A liquid-level alarming system according to claim 4, wherein said alarm means comprises a silicon controlled rectifier connected in series with a buzzer shunted by a capacitor, the gate of said silicon controlled rectifier being adapted to receive said drive signal from said drive signal generating means.

6. A liquid-level alarming system according to claim 5, wherein said alarm means further comprises a warning lamp adapted to glow in response to said drive signal from said generating means.

* * * * *